United States Patent [19]

Sumiyoshi et al.

[11] Patent Number: 4,551,393
[45] Date of Patent: Nov. 5, 1985

[54] HEAT-RESISTANT SHIFT MEMBER

[75] Inventors: Kikuo Sumiyoshi; Eiji Sato, both of Fujisawa; Kazuo Hirai, Kamakura; Kingo Miyasaka; Masayoshi Izumi, both of Ayase, all of Japan

[73] Assignee: Oiles Industry Co., Ltd., Tokyo, Japan

[21] Appl. No.: 522,009

[22] Filed: Aug. 11, 1983

[30] Foreign Application Priority Data

Aug. 16, 1982 [JP] Japan .................. 57-140987

[51] Int. Cl.$^4$ .............................................. F16J 15/12
[52] U.S. Cl. ..................................... 428/609; 428/591
[58] Field of Search ................... 428/609, 591; 74/579

[56] References Cited

U.S. PATENT DOCUMENTS 3,404,061 10/1968 Shane et al. ......................... 428/408
4,209,177 6/1980 Hall ..................................... 277/101

FOREIGN PATENT DOCUMENTS 23966 11/1969 Japan .
76759 6/1979 Japan .
124766 9/1981 Japan .
2031074 4/1980 United Kingdom .
1602989 11/1981 United Kingdom .

Primary Examiner—Veronica O'Keefe
Attorney, Agent, or Firm—LeBlanc, Nolan, Shur & Nies

[57] ABSTRACT

A heat-resistant shift member is disclosed which comprises a fundamental body having substantially a desired configuration and formed of one or more of compressed heat-resistant materials such as expanded graphite with entangled wires being firmly embedded therein, and a shifting surface layer member integrally covering the shifting surface of the fundamental body which is formed of one or more of compressed other heat-resistant materials, such as asbestos as well as one or more of powdered solid lubricant compounds such as metallic sulphide with entangled other metal wires made of copper alloy being firmly embedded therein, whereby both of the metal wires are also partially entangled with each other. There is also disclosed a method for manufacturing the same.

3 Claims, 11 Drawing Figures

HEAT-RESISTANT SHIFT MEMBER

BACKGROUND OF THE INVENTION

The present invention relates to a shift member and more particularly to a heat-resistant shift member, and also relates to a method for manufacturing the same.

Here the term "heat-resistant shift member" used throughout the present Specification and claims should be interpreted to designate an element which can carry a load with a low coefficient of friction even under temperatures in which the application of generally used lubricant oils is difficult and additionally has a sealing function, i.e. as a sealing element to be used at elevated temperatures, e.g. a bearing bush, a washer, a sliding board, a contact type packing or the like.

Hitherto, as a shift member of this kind or metallic member made of stainless steel, copper alloy within which are embedded pellets of a solid lubricant, a non-metallic material made of graphite, ceramics, etc., a compound material such as the so-called "cermet", heat-resistant plastic material such as polytetrafluoroethylene (PTFE), polyamid, etc. have been publicly known.

However, although these materials are all excellent in heat resistance, they have problems in friction and wear under dry friction conditions and difficulties in mechanical strength, in particular shock impact resistance, not necessarily having good conformability with the counter member, and cannot fulfill those functions sufficiently in the case of minute sliding.

In order to solve these difficulties or problems, as disclosed in e.g. U.S. Pat. No. 1,137,373, Japanese Patent Publication No. 23966/1969, etc. a shift member has already been developed wherein expanded graphite obtainable by a special treatment of graphite is shaped in association with a reinforcing member. Although these publicly known shift members have good heat resistance revealing superiority in conformability with the counter member and have improved shock impact resistance compared with regular graphite, the coefficient of friction is rather somewhat higher than that of regular graphite and they have a defect in that they after generate abnormal frictional sounds at the time of shifting under dry friction conditions.

Further a shift member which is produced by similarly shaping a heat-resistant material such as mica, asbestos, etc. together with reinforcing materials has also been publicly known, but it has problems similar to those in the above described shift members.

The reasons why therefor, are considered to reside in the fact that these shift members have large differences in friction coefficients between their static and dynamic friction, and they have a certain extent of flexibility, and also it is considered that the shapes and the natural frequencies of the various components constituting the slip system has an effect on those phenomenon.

SUMMARY OF THE INVENTION

It is an object of the present invention to provide a heat-resistant shift member which is suitable to be used under dry friction conditions over a wide range of temperatures ranging from room temperature to high temperatures.

It is another object of the present invention to provide a heat-resistant shift member which is suitable to be used under such conditions where the relative shifting surfaces do not allow lubricant oils, waxes, etc. to be applied due to high temperature conditions.

It is another object of the present invention to provide a heat-resistant shift member which does not generate abnormal frictional noise even if it is used under the conditions as stated above.

It is a still further object of the present invention to provide a heat-resistant shift member which has superior friction wear resistance even if it is used under the conditions as stated above.

It is a further object of the present invention to provide a heat-resistant shift member which has good conformability with the counter member and also displays a sealing function.

It is also an object of the present invention to provide a method for manufacturing a heat-resistant shift member in accordance with the present invention as described above.

For the purpose of attaining these objects the present inventors have earnestly conducted studies relating to the various properties of the hitherto known shift members such as described above. As a result they found that these objects could be achieved by improving the surface of a shift member base material which is obtainable by shaping heat-resistant materials such as expanded graphite, mica, asbestos, etc. together with reinforcing materials such as metal mesh, etc., and in particular confirmed that the generation of abnormal frictional sound could be effectively suppressed without deteriorating the other properties.

Thus, in accordance with the present invention a heat-resistant shift member is provided which is characterized in that a shift member base material having generally the desired comfiguration is prepared by shaping one or more of heat-resistant materials selected from the group comprised of expanded graphite, mica, asbestos, etc. together with a reinforcing material of stainless steel metal mesh so as to have the heat-resistant materials and the reinforcing material integrally confined with each other, and that a shifting surface layer member is prepared which is manufactured such that a heat-resistant sheet comprised of paper, non-woven cloth, woven cloth composed of one or more filaments made of asbestos, carbon (excluding expanded graphite), glass, etc. is covered with a powdered solid lublicating compound, and the heat-resistant sheet thus covered with the lubricating compound is reinforced by putting it on metal mesh made of fine copper alloy wires, and that the surface of the shift member base material is integrally covered with the shifting surface layer member under compression such that both the metal meshes are entangled with each other.

As can be seen, the shift member in accordance with the present invention is characterized in that the surface of a shift member base material, which is integrally composed of the heat-resistant material with the reinforcing material made of stainless metal mesh, is covered with the powdered solid lublicant compound reinforced by copper alloy mesh such that the lubricant compound is integrally bonded to the shift member base material with both metal meshes entangled with each other.

That is, in the heat-resistant shift member according to the present invention the heat-resistant material e.g. expanded graphite, uniformly fills the openings or the gaps between the metal wires of the stainless steel mesh as the reinforcing material, the reinforcing material itself being deformed by compression to become a mutually entangled state, and the powdered solid lubricant compounds reinforced by the copper alloy mesh and disposed on the surface of the shift member base material uniformly fill the openings or the gaps between the fine copper alloy wires in completely the same way, the reinforcing material made of the copper alloy mesh being deformed to be entangled not only with each other, but also with the reinforcing material of the shift member base material made of stainless steel mesh, so that the shift member base material and the shifting surface layer member are integrally bonded together.

Further, in accordance with the present invention a method for manufacturing the heat-resistant shift member as described above is provided which is characterized in comprising the following steps:

(a) preparing a cylindrical fundamental body element by either alternately piling up sheet-like heat-resistant materials such as expanded graphite sheets and a stainless steel mesh as the reinforcing material, or the sheet-like heat-resistant material and the metal mesh being piled up and then convoluted together, or cylindrically knitted stainless steel mesh having been radially flattened and the heat-resistant material introduced between the space formed by the confronting meshes, and being convoluted together, whereby a cylindrical body is provided;

(b) preparing a shifting surface layer member element by covering the heat-resistant sheet material with the powdered solid lubricant compound and further by having the heat-resistant sheet material thus covered with the powdered lubricant compound put on a copper alloy mesh;

(c) winding on the cylindrical base element the member for forming the shifting surface layer or introducing onto the cylindrical base element the for member forming the shifting surface layer after being convoluted whereby a preform of the shift member is provided; and (d) compressing the preform axially along the lamination direction of the cylindrical base element so that both of the metal meshes are deformed, causing the metal meshes between the respective layers of the cylindrical base element and the member for forming a shifting surface layer to be entangled with each other.

Among the above steps, as to the step (b), in the case where the powdered form heat-resistant material is used as the heat-resistant sheet member, it is preferable to adopt such a measure that the fine copper alloy mesh as the reinforcing member is put on an endless belt, and the heat-resistant material in a powder form and the powdered solid lubricant compound wetted with a weak adhesive solution are spread on the copper alloy mesh, and compressed by e.g. rollers, whereby the mesh and the powdered solid lubricant compound are integrally bonded together. However, since this procedure needs considerable equipment and technical skill, when a sheet-like heat-resistant material is available, the use of this material makes the manufacturing process easier.

It is to be noted that the advantage of the use of the member for forming the shifting surface layer integrally composed of the metal mesh and the heat-resistant material resides in that the internal structure of the product after being compressed and shaped is relatively uniform, there is less dispersion between the products, and its sealing properties are superior. Therefore, even when the sheet-like material is used as the heat-resistant material for the member for forming the shifting surface layer, it is advantageous that prior to the step of winding the metal mesh and the heat-resistant material they are previously compressed so that the heat-resistant material fills the openings of the meshes.

As to the step (d), if it is assumed that the compressive force is applied in a direction at right angles to that of the lamination, since the entangling of the meshes between the layers does by no means occur, the compressed product obtained becomes one having very weak strength, being scarcely it for use as a shift member according to the present invention which aims to carry a load accompanied by slip.

Further, it should be added that, in the present invention, as to the technique to constitute a shift member from a heat-resistant material and a reinforcing material as well as to shape them into the shift member the techniques as disclosed in e.g. Japanese Laid-Open Patent Publication Nos. 76759/1979, 124,766/1981, etc. are generally applied.

BRIEF DESCRIPTION OF THE DRAWINGS

These and other objects of the present invention will become more readily apparent upon reading the following specification and upon reference to the accompanying drawings, in which.

DESCRIPTION OF THE PREFERRED EMBODIMENTS

As has already been described above, a shift member in accordace with the present invention is manufactured by the following steps:

(a) preparing a cylindrical base material such that a heat-resistant material comprising expanded graphite, etc. and stainless steel meshes are laid one upon another, and then are integrally convoluted together;

(b) perparing a shifting surface layer member such that a sheet-like heat-resistant material comprising such as asbestos, etc. is covered with a powdered solid lubricant compound and the material together with the compound is laid on metallic mesh made of fine copper alloy wires;

(c) preparing a preform such tha the shifting surface layer member is wound around the cylindrical base material so that the powdered solid lubricant compound is exposed outside; and (d) putting the preform into a metal die and compressing it in the axial direction of the cylindrical base material so that the metal meshes are entangled with each other and the heat-resistant materials fill the openings of the meshes as well as the gaps between the wires constituting the meshes.

Now the manufacturing processes described above will be respectively explained more fully below in reference to the accompanying drawings.

Figure 1:
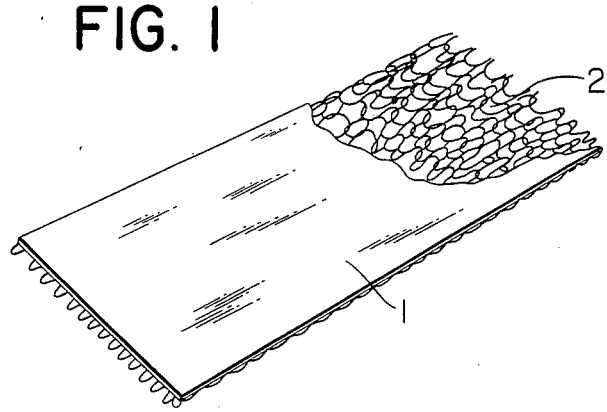
FIG. 1 is a perspective view illustrating stainless steel mesh with a sheet-like expanded graphite being put on one of its surfaces, as one of the forms of the base material of one embodiment of a shift member according to the present invention.

(a) The manufacturing process of the cylindrical base material:

FIG. 1 is a perspective view illustrating, as the first step of this process, the state of putting sheet-like expanded graphite 1 as a heat-resistant material on a stainless steel mesh 2 as a reinforcing material.

Figure 2:
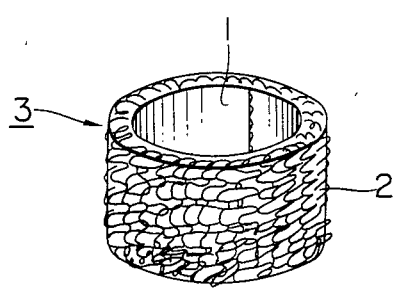
FIG. 2 is a perspective view illustrating a cylindrical assembly obtained by convoluting the base material shown in FIG. 1 with the stainless steel mesh being directed outside.

FIG. 2 is a perspective view of a cylindrical base material 3 which is obtained by, as the second step of this process, convoluting the assembly obtained by the 1st step as stated above and shown in FIG. 1 with the heat-resistant material 1 inside.

Figure 3:
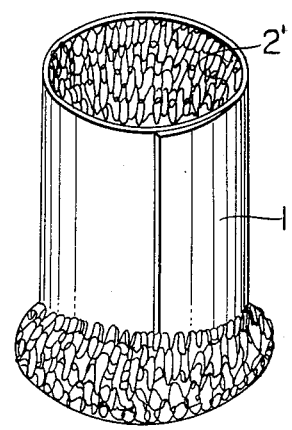
FIG. 3 is a perspective view illustrating cylindrically knitted stainless steel mesh with its outer periphery being surrounded by a sheet-like expanded graphite, as another form of the base material.

FIG. 3 is a perspective view illustrating as a modification of the steps shown in FIGS. 1 and 2 the state that cylindrically knitted stainless steel mesh 2' has its outer periphery covered with sheet-like expanded graphite 1 in substantially one layer and one end of mesh 2' is begun to be wound outwardly axially together with graphite 1.

Figure 4:
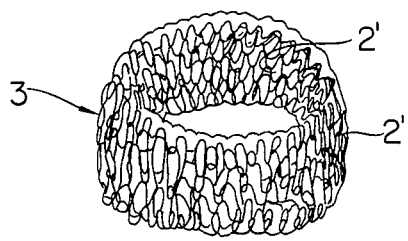
FIG. 4 is a perspective view illustrating a cylindrical assembly which is obtained by winding outwardly and axially the base material shown in FIG. 3 from one of its ends.

FIG. 4 is a perspective view of a cylindrical base material 3' completely wound. In this case, cylindrical base material 3' reveals on its inner and outer peripheries metal mesh 2'.

Contrarily, when the assembly shown in FIG. 1 is convoluted with heat-resistant material inside the obtained cylindrical base material 3 it reveals, as shown in FIG. 2, heat-resistant material 1 and metal mesh 2 on the inner end outer peripheries, respectively. Of course, it will be apparent that if the assembly shown in FIG. 1 is convoluted with heat-resistant material 1 outside, a cylindrical base material is obtainable in which metal mesh 2 and heat-resistant material 1 are located on the inner and outer peripheries, respectively. Further, in the assembly shown in FIG. 1, if heat-resistant material 1 having a lengthwise dimension or a convolute dimension longer than that of the metal mesh 2 by approximately one convolution a cylindrical base material is obtainable in which both the inner and outer peripheries exhibit heat-resistant material.

Figure 5:
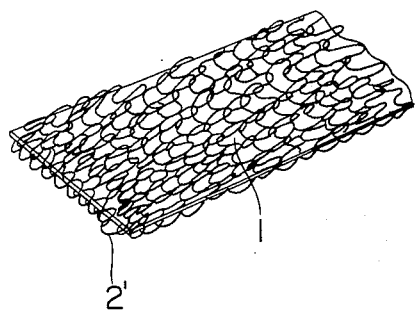
FIG. 5 is a perspective view illustrating still another form of the base material in which cylindrically knitted stainless steel meshes are radially crushed and a sheet-like heat-resistant material is introduced into the gap formed between the confronting meshes.

FIG. 5 is a perspective view illustrating another form of the assembly shown in FIG. 1 in which cylindrically knitted metal meshes are crushed radially so as to become band-like metal meshes 2' and a heat-resistant material 1 is introduced between the gap formed between the confronting meshes. In this case, if the lengths of band-like metal meshes 2' and heat-resistant material 1 are selected so as to be equal, the cylindrical base material obtainable by convoluting this assembly in a manner similar to that shown in FIG. 2 reveals metal mesh on both the inner and outer peripheries.

Figure 6:
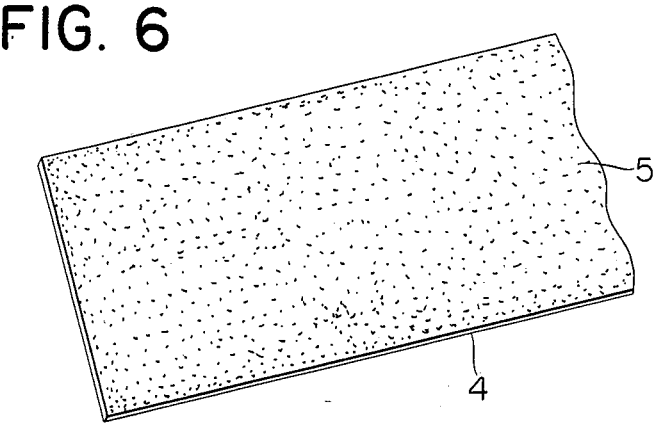
FIG. 6 is a perspective view illustrating one constitutional element of the shifting surface layer member obtained so that a sheet-like heat-resistant material has both its surfaces covered with a powered solid lubricant compound, respectively.

(b) The manufacturing process of the shifting surface layer member:

FIG. 6 is a perspective view illustrating an assembly in which powdered solid lubricant compound 5 is spread on the surface of a sheet-like heat-resistant material 4 constituting the base material in the process. Sheet-like heat-resistant material 4 that can be used has a thickness of about 0.05 to 1.0 mm, preferably 0.2 to 0.6 mm and comprises paper, non-woven or woven cloth made of filaments of asbestos, carbon, glass (potassium titanate, alumina-silica, soda-lime glass, etc.).

On the surface of this sheet-like material 4, a thin layer of an adhesive is applied and the desired composition of powdered solid lubricant compounds 5 are then spread on the adhesive layer. Upon hardening of the adhesive, the covering of sheet-like material 4 with powdered solid lubricant compound powders 5 is completed. The adhesive to be used need not be able to withstand temperatures of several hundred degrees centigrade. Instead it is necessary for the adhesive to have only such adhesive strength that it makes the separation or drop of the applied powdered solid lubricant compound difficult during the manufacturing stage of the shift member or during normal handling in the inspection, packing, transportation, assembly, etc. of the shifting surface layer member, and also makes the easy separation of the shifting surface layer member from the surface of the base material due to load or slip at the time of use of the shift member difficult.

As the adhesive the following can be utilized i.e. epoxy resin, phenol resin, polyimide (including polyimideimide resin), polyvinyl alcohol, corn syrup, gum arabic, glue, sodium alginate, etc.

Instead of spreading the powdered solid lubricant compound on the sheet-like heat-resistant material the surface of which is coated with the adhesive, a powdered solid lubricant compound in which the adhesive is mixed may be used, or the compound and the adhesive are mixed together with solvent so as to obtain a slurry-or paste-like substance, and this substance may be applied on the sheet-like material as a thin layer.

In this case, since the sheet-like material has meshes with openings between the adjoining filaments, etc., when a corresponding mass of the powdered solid lubricant compound can fill these meshes, openings, etc. the adhesive as above exemplified does not necessarily need to be applied.

It is also preferable that the powdered solid lubricant compound is dispersed in an appropriate dispersing medium and the dispersed compound is coated on the sheet-like material, or the coated material is applied, after coating, a pressure thereon so that the compound fills the meshes, openings, etc. and at the same time covers the surface of the sheet-like material as a thin layer of the compound.

This procedure of applying the powdered solid lubricant compound is particularly effective when the particles of the powdered solid lubricant compound are sufficiently fine enough e.g. to an order of $10^{-1}\mu$ and yet have such properties that the particles easily coagulate with each other after the process of subjecting the sheet-like material to the application and penetration of the dispersed compound.

The thickness of the powdered solid lubricant compound after it is applied to the surface of the sheet-like material is preferably below 0.5 mm, usually 0.02 to 0.3 mm.

Figure 7:
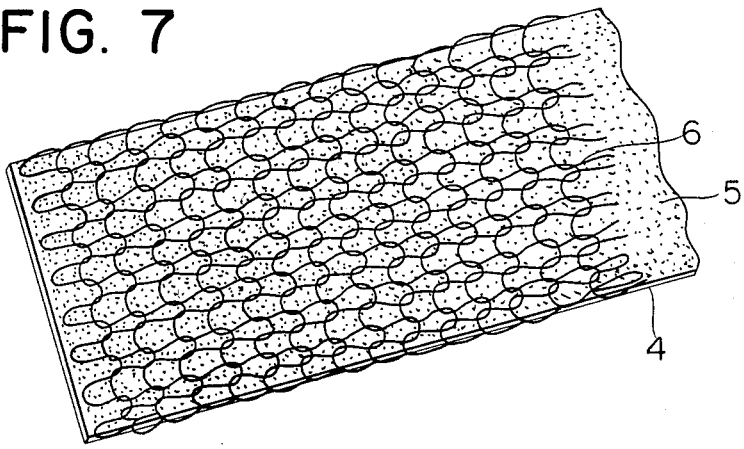
FIG. 7 is a perspective view illustrating one of the forms of the shifting surface layer member which is obtained so that cylindrically knitted copper alloy mesh is radially crushed and the element shown in FIG. 6 is introduced into the gap formed between the confronting meshes.
Figure 8:
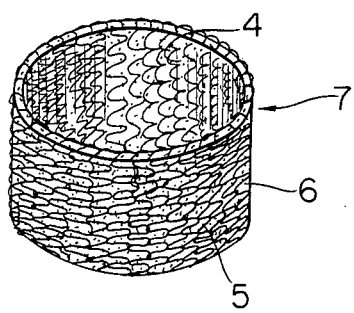
FIG. 8 is a perspective view illustrating another form of the shifting surface layer member obtained by convoluting the member shown in FIG. 7.

Succeedingly the sheet-like material coated with the powdered solid lubricant compound thus obtainable and constituting the fundamental element of this process is reinforced by metallic mesh made of fine copper alloy wires as shown in FIG. 7 in a perspective view wherein a cylindrically knitted metal mesh made of fine copper alloy wires is radially crushed so as to be flattened wire mesh 6, and sheet-like material 4 is introduced into the gap formed between the confronting meshes 6. FIG. 8 is a perspective view illustrating a cylndrical member 7 which is obtained by convoluting the assembly shown in FIG. 7 so as to be convenient for combining with the cylindrical base material.

This cylindrical member 7 is usually a single winding formed such that the beginning and the end portions are adapted to slightly overlap each other, but it may be doubly wound or more so as to form a cylindrical member.

(c) The process of winding the shifting surface layer member around the cylindrical base material;

As the process for having the outer or inner periphery of the cylindrical base material obtained by the process (a) wound or introduced by the shifting surface layer member obtaned by the process (b) the following procedures are conceivable.

(i) The cylindrically knitted wire mesh is crushed radially to form a band-like wire mesh and introduced between confronting meshes is the sheet-like material, and the shifting surface layer member is wound around the cylindrical base material such that the surface on which the powdered solid lubricant compound is applied is directed outwards;

(ii) Similar to the procedure (i) the cylindrically knitted wire mesh into which the sheet-like material is introduced is convoluted and is introduced into the cylindrical base material;

(iii) The assembly in which the cylindrically knitted wire mesh with the sheet-like material introduced therebetween as processed by the above process (i) or the assembly in which the metal mesh made of fine copper alloy wires is put on the sheet-like material, is rolled by rollers so that the sheet-like material and the metal meshes strongly adhere together to become an integral member, and the thus prepared assembly is wound around the cylindrical base material; and (iv) The sheet-like material covered with the powdered solid lubricant compound is put on the wire mesh made of fine copper alloy wires, and it is simply wound around the cylindrical base material so that the outside of the sheet-like material is directed outwards.

Among these processes, the process (iii) in which the sheet-like material and the wire mesh are previously compressed together so as to become an integral member, has, compared with the process (i) and (ii) in which no pressure is applied between the sheet-like material and the metal mesh such an advantage that the distribution of the powdered solid lubricant compound and the fine copper alloy wires exposed on the surface of the finished shift member is more uniform than that of the shift member which is obtainable through a compressing process to be described later. As to the process (iv) no fine copper alloy wires are exposed on the surface of the finished shift member, only the powdered said lubricant layer being exposed.

(d) The compression process:

According to the process (iii) described above, sheet-like shifting surface layer member 7 covered with the powdered solid lubricant compound and reinforced by wire mesh made of fine copper alloy wires is wound around or introduced into cylindrical base material 3 or 3', as shown in FIGS. 2 or 4 and the thus obtained preform is next received in a metallic die and axially compressed therein, whereby a finished product is obtained. In this case, the compressive force to be applied is preferably 1 to 3 $t/cm^2$.

Figure 9:
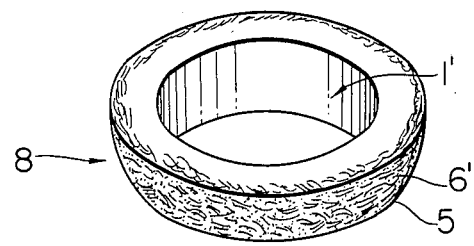
FIG. 9 is a perspective view illustrating one embodiment of a shift member in accordance with the present invention embodied as a seal bearing.
Figure 10:
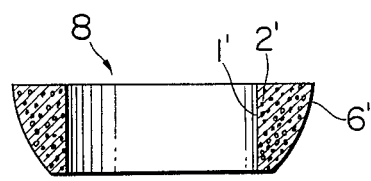
FIG. 10 is a longitudinal sectional elevational view of the embodiment shown in FIG. 9.
Figure 11:
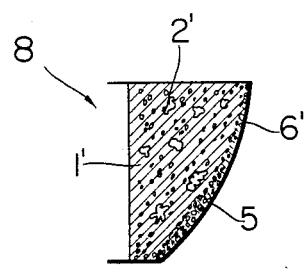
FIG. 11 is an enlarged view of a portion of FIG. 10.

FIG. 9 is a perspective view of a seal bearing as an embodiment of the shift member in accordance with the present invention and obtained by winding sheet-like shifting surface layer member 5 which is reinforced by wire mesh 6 made of fine copper alloy wires as shown in FIG. 8 around cylindrical base material 3 shown in FIG. 2 and the preform thus prepared is introduced into the metallic die and axially compressed therein. In FIG. 9 the reference numeral 1' is a heat-resistant material, and 6' is the scattered fine copper alloy wires that constituted wire mesh 6, exposed on the shifting surface 8 and subjected to deformation. FIG. 10 is a longitudinal sectional elevational view of FIG. 9 and FIG. 11 is an enlarged partial view of FIG. 10.

In these drawings, the reference numeral 1' denotes the heat-resistant materials which are formed as the result of heat-resistant material 1 being integrally bonded together by being subjected to deformation at the time of compression in the metallic die, and 2' is the stainless steel mesh 2 after similarly being subjected to deformation. It will be appreciated that in the longitudinal sectional view of the shift member the cross-section of stainless steel wire 2' is represented and fine copper alloy wires 6' are also represented by their cross-sections.

The shift member in accordance with the present invention is manufactured through the processes as stated above and had the constitution as stated above.

Now the principal materials of the shift member will be explained more fully below.

For the expanded graphite among the materials constituting the cylindrical base material a sheet made of expanded graphite or its powders is effectively used, whereby the expanded graphite itself is disclosed in Japanese Patent Publication No. 23966/1969 and sold by the Union Carbide Corp. of the U.S.A.

For the mica, natural or synthetic mica powders or mica powders bonded together by silicon resin to form mica paper are preferable.

For the asbestos the filaments or powders of crystal or amostite base asbestos, or asbestos paper or sheets made of the powders of these kinds of asbestos are effectively used.

Stainless steel wires as the reinforcing material for the base material are preferably those obtainable by weaving or knitting fine wires made of SUS 304 or 316 as defined by the Japanese Industrial Standard (JIS) for austenitic stainless steel or SUS 430 as defined by JIS for ferritic stainless steel, in particular knitted mesh is preferable. The wire diameter can be exemplified as being 0.10 to 0.5 mm, with meshes of 3 to 6 mm being the most preferable.

As to the copper alloy mesh as the reinforcing element for the shifting surface layer member those made of copper-nickel alloy (white copper), copper-nickel-zinc alloy (nickel silver) are the most preferable. In addition metal mesh made of fine wires of brass or beryllium copper may also be used. The wire diameter and the meshes are similar to those for the stainless steel mesh. Knitted wire mesh in particular cylindrically knitted mesh are preferable.

Among the constitutional elements of the shifting surface layer member the powdered solid lubricant compound may comprise any one or combination of (i), (ii), (i)+(ii), (i)+(ii)+(iii), (i)+(ii)+(iii)+(iv), (i)+(ii), (ii)+(iii), (ii)+(iii)+(iv), (ii)+(iv) selected from the groups (i) to (iv) wherein:

(i) Metallic sulphide: $MoS_2$, $WS_2$, $Sb_2S_3$, PbS, FeS
(ii) Graphite (scaly graphite, etc., excluding expanded graphite) and BN, PTFE;
(iii) Copper and copper alloy: Cu, 91Cu-4Fe-5Mn, brass, bronze; and
(iv) Metallic fluoride: $CaF_2$, $BaF_2$, LiF.

In particular, the most preferable combinations are listed in Table 1.

TABLE 1

| Combination | Example (Volume %) |
| --- | --- |
| (i) + (ii) | 85 $MoS_2$ + 15 Graphite; 50 $WS_2$ + 40 PTFE + 10 Graphite |
| (i) + (ii) + (iii) | 45 $WS_2$ + 20 Graphite + 35 (91Cu—4Fe—5Mn) |
| (i) + (ii) + (iii) + (iv) | 40 $WS_2$ + 20 Graphite + 30 (91Cu—4Fe—5Mn) + 10 $CaF_2$ |
| (i) + (ii) + (iv) | 80 $WS_2$ + 15 Graphite + $CaF_2$ |
| (i) + (iii) | 70 $WS_2$ + 30 (91Cu—4Fe—5Mn) |

Note: The respective numerals affixed to the respective elements of (91Cu—4Fe—5Mn) represent wt. %.

The powders shown in the respective groups are used in a minute powder form on the order of approximately below 100 mesh. Further, among those groups, when the group (ii) is used it is effective to be used in combination with the group (iv).

Although the elements shown in group (iv) are not of themselves such low friction substances, by the combined use with those shown in group (ii) oxidizing loss at high temperatures is prevented contributing to the maintainence of lubricability.

The powders of the copper and copper alloy as shown in the group (iii) can not be said to be solid lubricants of themselves, but by combining them with the solid lubricant compounds as described in the other groups the apparent hardness of the surface is increased, the supply of the solid lubricant compound to the friction surface is controlled, narrowing the difference between the coefficient of static and dynamic friction, and contributes to suppressing the generation of abnormal frictional sounds.

"PTFE" among the group (ii) remarkably contributes to a decrease in the coefficient of friction of the solid lubricant compound, and since its frictional behaviour in regard to sliding velocity does not represent a "negative resistance" it can considerably improve the phenomena of "adhesion-slip", contributing to prevention of the generation of abnormal frictional sounds, but on the other hand, since PTFE can not withstand long periods of use under conditions exceeding an environmental temperature of 400° C., its combined use with the solid lubricant compound to be used under such conditions must be avoided.

The results of the experiments conducted to investigate the property of the shift member in accordance with the present invention are shown in Table II in which the results of conventional members simultaneously tested as also shown.

Test Conditions:
Load ... 5 kg/cm$^2$
Sliding Velocity ... 1.2 m/min
Environmental Temperature ... 400° C.
Counter Member ... SUS 304

TABLE 2

| | | Present Invention | Conventional Shift Member | |
| --- | --- | --- | --- | --- |
| Reinforcing Material | | (SUS 304) Knitted Stainless Steel Mesh | (SUS 304) Knitted Stainless Steel Mesh | |
| Heat Resistant Material | | Expanded Graphite (In association with a sheet) | Expanded Graphite (In association with a sheet) | |
| Solid Lubricant Compound | Constitution | 40 $WS_2$ + 20 Graphite + 30 (Cu—Fe—Mn) + 10 $CAF_2$ | 40 $WS_2$ + 20 Graphite + 30 (Cu—Fe—Mn) + 10 $CAF_2$ | None |
| | Solid Lubricant Sheet | Carbon Paper | None (Directly Applied to the Surface Comprising Expanded Graphite) | |
| | Reinforcing Metal Mesh | (JISH3721 NSW2) Bag-like Knitted Nickel-Siver Metal Mesh | (SUS 3041 Bag-like Knitted Stainless Steel Mesh | |
| Coefficient of Friction | | 0.1–0.12 | 0.1–0.15 | 0.05–0.2 |
| Wear Amount (mm) | | 0.05–0.1 | 0.05–0.15 | 0.1–0.4 |
| Abnormal Frictional Sounds | | I–II | I–III | IV |
| State of Counter Member | | Good: Formed with a thin black film of Solid Lubricant Compound | Linear Scratches are recognized, but no congelation of fine stainless steel wires is recognized. | Abnormal congelation of the expanded graphite and partial cohesion of stainless steel wires are recognized. |

In Table II the value of the coefficient of friction is represented by the value after the lapse of 1 hour from the start of test, and the value of the wear is represented by the value after the lapse of 20 hours from the start of the test. The evaluation of abnormal frictional sound is determined by the following criteria:

I: Only usual frictional sounds generated, no abnormal frictional sounds generated;

II: While keeping the ear near the test piece, in addition to frictional sounds abnormal sounds can be faintly heard;

III: At a definite position (a point spaced 1.5 m apart from the test piece) frictional sounds can be hardly heard, being aborped by ambient sounds, so it is generally difficult to discriminate the former from the latter, but can be discriminated by the tester;

IV: At a definite position anyone can discriminate abnormal frictional sounds as unpleasant sounds.

As can be seen from Table II the shift member according to the present invention, compared with the conventional ones, exhibits substantially the same coefficient of friction value, but as to wear amounts the former exhibits generally good results, and, in particular, as to the abnormal frictional sounds the present invention obtained a good evaluation. Further, it was also superior in its conformance with the counter member.

It is to be understood that although certain embodiments of this invention have been illustrated and described, it is not to be limited thereto except insofar as such limitations are included in the annexed claims.

What is claimed is:

1. A heat-resistant shift member comprising: (a) a fundamental body having substantially a desired configuration formed by shaping at least one heat-resistant material selected from the group consisting of expanded graphite, mica and asbestos, together with a reinforcing material of stainless steel metal mesh so that the heat resistant material and the reinforcing material are integrally combined with each other; and (b) a shifting surface layer member formed of a heat-resistant sheet material selected from the group consisting of paper, non-woven cloth, woven cloth composed of one or more filaments made of asbestos, carbon other than expanded graphite and glass, said heat-resistant sheet material being covered with a powdered solid lubricating compound, the heat-resistant sheet material thus covered with said lubricating compound being reinforced by a metal mesh made of fine copper alloy wires, and the surface of said fundamental body being integrally covered with said shifting surface layer member, whereby the metal meshes of said fundamental body and said shifting surface layer member are entangled with each other.

2. A heat-resistant shift member as claimed in claim 1 wherein said copper alloy is copper-nickel alloy, of copper-nickel-zinc alloy, or brass, or beryllium copper.

3. A heat-resistant shift member as claimed in claim 1 wherein said powdered solid lubricant compound is selected from the group consisting of any one or a combination of the groups (i) to (iv) such as (i), (ii), (i)+(ii), (i)+(ii)+(iii), (i)+(ii)+(iii)+(iv), (i)+(iii), (ii)+(iii), (ii)+(iii)+(iv), or (ii)+(iv), whereby said groups (i) to (iv) are respectively as follows:
  (i) metallic sulfide;
  (ii) graphite (excluding expanded graphite), or boron nitride, or tetrafluoroethylene resin;
  (iii) copper, or copper alloy; and
  (iv) metallic fluoride.

* * * * *